(12) United States Patent
Jarvis et al.

(10) Patent No.: US 9,127,102 B2
(45) Date of Patent: *Sep. 8, 2015

(54) THICKENING VINYL COPOLYMERS

(71) Applicant: Conopco, Inc., Englewood Cliffs, NJ (US)

(72) Inventors: Adam Peter Jarvis, Tarporley (GB); Adam John Limer, Newton-le-Willows (GB); Martin Swanson Vethamuthu, Stewartsville, NJ (US)

(73) Assignee: Conopco, Inc., Englewood Cliffs, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/347,743

(22) PCT Filed: Sep. 24, 2012

(86) PCT No.: PCT/EP2012/068731
§ 371 (c)(1),
(2) Date: Mar. 27, 2014

(87) PCT Pub. No.: WO2013/045376
PCT Pub. Date: Apr. 4, 2013

(65) Prior Publication Data
US 2014/0243479 A1    Aug. 28, 2014

(30) Foreign Application Priority Data
Sep. 28, 2011 (GB) .................................. 1116659.2

(51) Int. Cl.
| | | |
|---|---|---|
| *C08F 22/10* | (2006.01) | |
| *C08F 120/18* | (2006.01) | |
| *C08F 265/06* | (2006.01) | |
| *C08F 290/06* | (2006.01) | |
| *C08L 33/14* | (2006.01) | |
| *C09D 7/00* | (2006.01) | |
| *C08F 220/18* | (2006.01) | |

(52) U.S. Cl.
CPC .............. *C08F 22/10* (2013.01); *C08F 120/18* (2013.01); *C08F 265/06* (2013.01); *C08F 290/062* (2013.01); *C08L 33/14* (2013.01); *C09D 7/002* (2013.01); *C08F 220/18* (2013.01); *C08F 2438/00* (2013.01)

(58) Field of Classification Search
CPC ...... C08F 22/10; C08F 120/18; C08F 265/06; C08F 290/062

USPC ............................ 526/318.2, 318.43; 525/301
See application file for complete search history.

(56) References Cited

U.S. PATENT DOCUMENTS

| | | | |
|---|---|---|---|
| 4,529,773 A | 7/1985 | Witiak et al. | |
| 4,892,916 A * | 1/1990 | Hawe et al. | 526/304 |
| 5,010,140 A | 4/1991 | Antonelli | |
| 6,656,595 B2 * | 12/2003 | Nakajima et al. | 428/413 |
| 7,288,616 B2 | 10/2007 | Tamareselvy et al. | |
| 7,649,047 B2 | 1/2010 | Tamareselvy et al. | |
| 8,785,536 B2 * | 7/2014 | Mongoin et al. | 524/425 |
| 2003/0202953 A1 | 10/2003 | Tamareselvy | |
| 2009/0163622 A1 | 6/2009 | Albrecht | |
| 2011/0263774 A1 | 10/2011 | Mongoin | |

FOREIGN PATENT DOCUMENTS

| | | |
|---|---|---|
| EP | 0089213 B1 | 2/1986 |
| EP | 0728780 | 8/1996 |
| EP | 1197537 A2 | 4/2002 |
| GB | 1477372 | 6/1977 |
| WO | WO2010026097 A1 | 3/2010 |
| WO | WO2010070407 A1 | 6/2010 |

OTHER PUBLICATIONS

IPRP1 in PCTEP2012068733, Apr. 1, 2014.
IPRP2 in PCTEP2012068731, Dec. 16, 2013.
IPRP2 in PCTEP2012068732, Dec. 17, 2013.
Search Report in PCTEP2012068731, Oct. 23, 2012.
Search Report in PCTEP2012068733, Oct. 23, 2012.
Search Report in PCTEP2012068732.
Written Opinion in PCTEP2012068731, Oct. 23, 2012.
Written Opinion in PCTEP2012068732, Oct. 23, 2012.
Written Opinion in PCTEP2012068733, Oct. 23, 2012.
Copending Application for Jarvis et al., U.S. Appl. No. 14/347,740, filed Mar. 27, 2014 for Low Viscosity Suspending Vinyl Copolymers.
Copending Application for Jarvis et al., U.S. Appl. No. 14/347,751, filed Mar. 27, 2014 for Thickening Vinyl Copolymers.

* cited by examiner

*Primary Examiner* — Michael M Bernshteyn
(74) *Attorney, Agent, or Firm* — Ronald A. Koatz

(57) ABSTRACT

A rheology modifier copolymer of formula (I) wherein A is a macromonomer, B is an acrylic or methacrylic acid or salt thereof, C is a $C_1$-$C_8$ ester of (meth)acrylic acid, D is an associative monomer, and when present E is a crosslinking monomer.

$$*-[A]_a-[B]_b-[C]_c-[D]_d-[E]_e-* \quad (I)$$

11 Claims, No Drawings

THICKENING VINYL COPOLYMERS

BACKGROUND OF THE INVENTION

1. Field of the Invention

The invention relates to thickening vinyl copolymers, particularly hydrophobically modified alkali-swellable or alkali-soluble emulsion polymers.

2. The Related Art

Rheology modifiers are used as thickeners and structurants in a variety of consumer and industrial products. They affect product performance, aesthetics, application and suspension, and delivery of active chemical agents. Rheology modifiers are generally classed in several categories dependent on the mechanism by which they thicken.

Hydrodynamic thickeners work by utilizing acid groups in their structure that when neutralized form anionic charges. These repel each other causing the polymer chains to expand and entangle. Thickening and suspending effects of the neutralized polymers are due to increased physical packing of the molecules. These materials are also known as "space filling" or "volume exclusion". Both viscosity and yield point increase with concentration. The alkali swellable emulsions (ASE) and carbomers fall within this category.

Associative thickeners operate by a twin mechanism. They utilize the aforementioned hydrodynamic thickening method. Secondly, they utilize the association of hydrophobic groups on the polymer backbone with other hydrophobic species. The latter can be other hydrophobic polymer groups, oils, particles and the like. Association creates hydrophobic regions distributed throughout the polymer chain network. This also renders the polymers as effective solubilizing agents. The hydrophobically modified alkali swellable emulsions (HASE) fall into this category.

HASE/ASE polymers are produced by oil-in-water emulsion polymerization. Most consist of a lightly crosslinked backbone of ethyl acrylate and methacrylic acid.

U.S. Pat. No. 4,529,773 (Witiak et al.) reports alkali-soluble emulsion polymers activated by neutralization to a pH above 6.5, and subsequently acidified in the presence of a surfactant. These are described as useful thickeners in acidified containing compositions. The polymers are best formed from a 3-component monomer system of methacrylic or acrylic acid, methacrylic or acrylic acid ester of a $C_8$-$C_{30}$ alkyl or hydrocarbyl monoether of polyethylene glycol, and a $C_1$-$C_4$ alkyl acrylate or methacrylate.

U.S. Pat. No. 7,649,047 B2 and U.S. Pat. No. 7,288,616, both to Tamareselvy et al., disclose multi-purpose alkali-swellable and alkali-soluble associative polymers. They are formed from polymerizing a monomer mixture of at least one acidic vinyl monomer, at least one nonionic vinyl monomer, a first associative monomer having a first hydrophobic end group, a second associative monomer having a second hydrophobic end group, and a crosslinking or chain transfer agent. These patents describe the HASE type chemistry. A commercial product based on this chemistry is the Lubrizol Corp. supplied Aqua SF-1®.

WO 2010/026097 A1 (Graham et al.) describes rheology modifiers for use in home and personal care compositions. These modifiers are formed from four monomers. They include an amino-substituted vinyl monomer, a hydrophobic nonionic vinyl monomer (such as a $C_1$-$C_{30}$ alkyl ester of acrylic or methacrylic acid), an associative-like monomer (with a polyoxyalkylene unit end-capped with a hydrophobic group), and a further associative-like vinyl monomer.

Although the aforementioned disclosures and their commercial embodiments provide rheology modifying solutions, there still is a need for improvements in thickening profile and suspension clarity.

SUMMARY OF THE INVENTION

A rheology modifier is provided which is a copolymer of formula (I)

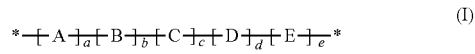

wherein a, b, c, d and e represent the percentage by weight that each repeating unit monomer is contained within the copolymer;

A is a macromonomer pre-formed by catalytic chain transfer comprising at one end a polymerizable group reactive during polymerization with at least one of B, C, D and E monomers, the reactive group at the one end of the macromonomer being attached to a chain formed of a homo- or co-polymer of $C_1$-$C_{22}$ alkyl acrylates, $C_1$-$C_{22}$ alkyl methacrylates, methacrylic acid, acrylic acid and combinations thereof, the macromonomer having a number average molecular weight ranging from about 200 to about 50,000; and B is acrylic or methacrylic acid or a salt thereof;

C is a $C_1$-$C_8$ ester of acrylic acid or methacrylic acid;

D is an associative monomer of formula (II)

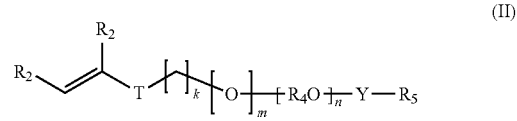

wherein each $R_2$ is independently H, methyl, —C(=O)OH, or —C(=O)$OR_3$;

$R_3$ is a $C_1$-$C_{30}$ alkyl;

T is —$CH_2$C(=O)O—, —C(=O)O—, —O—, —$CH_2$O—, —NHC(=O)NH—, —C(=O)NH—, Ar—$(CE_2)_z$-NHC(=O)O—, —Ar—$(CE_2)_z$-NHC(=O)NH—, or —$CH_2CH_2$NHC(=O)—;

Ar is divalent aryl;

E is H or methyl;

z is 0 or 1;

k is an integer in the range of 0 to 30; and m is 0 or 1; with the proviso that when k is 0, m is 0, and when k is in the range of 1 to 30; m is 1;

$(R_4O)_n$ is polyoxyalkylene, which is a homopolymer, a random copolymer, or a block copolymer of $C_2$-$C_4$-oxyalkylene units, wherein $R_4$ is $C_2H_4$, $C_3H_6$, $C_4H_8$, or a mixture thereof, and n is an integer in the range of 5 to 250;

Y is —$R_4$O—, —$R_4$H—, —C(=O)—, —C(=O)NH—, =$R_4$NHC(=O)NH—, or —C(=O)NHC(=O)—; and $R_5$ is substituted or unsubstituted alkyl selected from the group consisting of $C_8$-$C_{40}$ linear alkyl, $C_8$-$C_{40}$ branched alkyl, $C_8$-$C_{40}$ carbocyclic alkyl, $C_2$-$C_{40}$ alkyl-substituted, phenyl, aryl-substituted $C_2$-$C_{40}$ alkyl, and $C_8$-$C_{80}$ complex ester; wherein the $R_5$ alkyl group optionally comprises one or more substituents selected from the group consisting of hydroxy, alkoxy, and halogen; and E optionally is present as a cross linking monomer for introducing branching and controlling molecular weight, the cross linking monomer comprising polyfunctional units carrying multiple reactive fictionalisation groups selected from the group consisting of vinyl, allylic and functional mixtures thereof, the groups A, B, C, D and E being covalently bonded one to another in a random, a block, or a cross-linked copolymer format.

Amounts of "a" may range from about 0.5 to about 25% by weight; amounts of "b" may range from about 10 to about 80% by weight; amounts of "c" may range from about 30 to about 85% by weight; amounts of "d" may range from about 0.5 to about 15% by weight; and amounts of "e" may range from 0 to about 5% by weight of the total copolymer.

DETAILED DESCRIPTION OF THE INVENTION

Now we have found that copolymers constructed from a pre-formed macromonomer available from catalytic chain transfer polymerization, an acrylic or methacrylic acid, a $C_{1-8}$ ester of acrylic or methacrylic acid, an associative monomer and optionally a cross linking monomer, provide an excellent thickening profile and good clarity in aqueous compositions.
Macromonomer A The macromonomers A are polymeric substances preformed before reactions with the other B, C, D and E monomers that form the HASE of this invention. Macromonomers have at one of the chain ends a polymerizable group capable of reacting with one or more of the monomers of B, C, D and E to become incorporated into HASE. The reactive end group may be a $C_1$-$C_{22}$ alkyl methacrylate, $C_1$-$C_{22}$ alkyl acrylate, methacrylic acid, acrylic acid and combinations thereof. Illustrative, but not limiting, are methylmethacrylate, ethyl methacrylate, butyl methacrylate, ethyl hexyl methacrylate, stearylmethacrylate and mixtures thereof. These monomers can be transformed into macromonomers, the most preferred of which are poly(methylmethacrylate)/poly(methacrylic acid), poly(methylmethacrylate), poly(butylmethacrylate), poly(ethylhexylmethacrylate) and combinations thereof. In each of these macromonomers, one of the constituent monomers at an end of the chain will remain available for further vinyl reactivity with the other monomer constituents of the HASE copolymers. The Table below reports a series of macromonomers synthesized for the present invention.

| Macromonomer | Structure | Molecular Weight (Mn)/g mol$^{-1}$ |
|---|---|---|
| PMMA:PMAA (59:41) | | 1,100 |
| PMMA | R = H and Me | 600<br>1,500 |
| PBMA | | 370<br>700 |
| PEHMA | | 1,000<br>1,500 |

Macromonomers advantageously may have a number average molecular weight (Mn as determined by liquid permeation chromatography) ranging from about 200 to about 50,000, preferably from about 400 to about 10,000, and optimally from about 500 to about 3,000.

Amounts of the macromonomer in the HASE copolymer may range from about 0.5 to about 25%, preferably from about 0.5 to about 15%, more preferably from about 0.5 to about 5%, and optimally from about 1 to about 8% by weight relative to total weight of the copolymer.

Macromonomers are prepared by catalytic chain transfer (CCT) procedure utilizing catalysts effective to achieve CCT. Preferred but not limiting catalysts include the cobalt porphyrins and the cobaloximes (especially a tetramethyl-cobaloxime boron fluoride of $C_s$=17,900, and a tetraphenyl-cobaloxime boron fluoride). Molecular weights as low as dimers and trimers can easily be produced with these catalysts unlike with most polymerization techniques.

In copolymers of the present invention, cobalt ions may remain residually present in amounts from 1 to 100 ppm, more likely from 1 to 30 ppm, and even more likely from 3 to 10 ppm by weight. Residual cobalt in the macromonomer units may range for 1 to 100 pph by weight.
Monomer B Acidic vinyl monomers B suitable for use are acrylic acid, methacrylic acid, salts of the aforementioned acids and combinations thereof.

In certain embodiments, the acid groups may already be neutralized forming salts. Typical salt counterions to the acid groups are sodium, potassium, ammonium and triethanolammonium cations.

Amounts of the monoacidic vinyl monomer in the copolymers may range from about 10 to about 80%, preferably from about 25 to about 70%, more preferably from about 40 to about 50% by weight of the total copolymer.
Monomer C The copolymer may include monomers C formed from one or more $C_1$-$C_8$ esters of acrylic or methacrylic acid. Illustrative ester monomers are ethylacrylate, methylacrylate, ethylmethacrylate, methylmethacrylate, butylacrylate, butyl methacrylate and mixtures thereof.

When present, the amount of acrylate ester monomers in the copolymer may range from about 30 to about 85%, preferably from about 45 to 75%, and more preferably from about 50 to about 70% by weight.
Monomer D Associative vinyl monomers D suitable for use in the production of the copolymers are compounds preferably having an ethylenically unsaturated end group portion (i) for addition polymerization with the other monomers of the system; a polyoxyalkylene midsection portion (ii) for imparting selective hydrophilic properties to the product polymer; and a hydrophobic end group portion (iii) for providing selective hydrophobic properties to the polymer.

The portion (i) supplying the ethylenically unsaturated end group preferably is derived from an alpha, beta-ethylenically unsaturated mono or di-carboxylic acid or the anhydride thereof, more preferably $C_3$-$C_4$ mono- or di-carboxylic acid or the anhydride thereof. Alternatively, portion (i) of the associative monomer can be derived from an allyl ether or vinyl ether; a nonionic vinyl-substituted urethane monomer, such as disclosed in U.S. Reissue Pat. 33,156 or U.S. Pat. No. 5,294,692; or a vinyl-substituted urea reaction product, such as disclosed in U.S. Pat. No. 5,011,978.

The midsection portion (ii) is preferably a polyoxyalkylene segment of about 5 to about 250, more preferably about 10 to about 120, and most preferably about 15 to about 60 repeating $C_2$-$C_7$ alkylene oxide units. Preferred midsection portions (ii) include polyoxyethylene, polyoxypropylene, and polyoxybutylene segments comprising about 5 to about 150, more preferably about 10 to about 100, and most preferably about 15 to about 60 ethylene, propylene or butylene oxide units, and random or non-random sequences of ethylene oxide, propylene oxide and or butylene oxide units.

The hydrophobic end group portion (iii) of the associative monomers is preferably a hydrocarbon moiety belonging to one of the following hydrocarbon classes: $C_8$-$C_{40}$ linear alkyl, aryl-substituted $C_2$-$C_{40}$ alkyl, $C_2$-$C_{40}$ alkyl-substituted phenyl, $C_8$-$C_{40}$ branched alkyl, $C_8$-$C_{40}$ carbocyclic alkyl; and $C_8$-$C_{80}$ complex ester.

Examples of suitable hydrophobic end group portions (iii) of the associative monomers are linear or branched $C_8$-$C_{40}$ alkyl groups such as capryl, isooctyl, decyl, lauryl, myristyl, cetyl, cetearyl, stearyl, isostearyl, arachidyl, behenyl and mixtures thereof.

Examples of suitable $C_8$-$C_{80}$ complex esters include hydrogenated castor oil (predominately the glyceride of 12-hydroxystearic acid); 1,2-diacyl glycerols such as 1,2-distearyl glycerol, 1,2-dipalmityl glycerol, 1,2-dimyristyl glycerol, and the like; di-, tri-, or polymers of sugars such as 3,4,6-tristearyl glucose, 2,3-dilauryl fructose, and the like; and sorbitan esters such as those disclosed in U.S. Pat. No. 4,600,761.

U.S. Pat. No. 4,074,411 describes several processes for preparing associative monomers. These associative monomers are sometimes referred to as "vinyl surfactant esters" or "surfmers". These associative monomers may typically be prepared by the acid catalyzed condensation of commercially available nonionic polyoxyalkylene surfactant alcohols with acrylic, methacrylic, crotonic, maleic, fumaric, itaconic or aconitic acid.

Particularly preferred associative vinyl monomers include cetyl polyethoxylated methacrylate, cetearyl polyethoxylated methacrylate, stearyl polyethoxylated (meth)acrylate, arachidyl polyethoxylated (meth)acrylate, behenyl polyethoxylated methacrylate, lauryl polyethoxylated methacrylate, hydrogenated castor oil polyethoxylated methacrylate, and canola polyethoxylated (meth)acrylate, wherein the polyethoxylated portion of the monomer comprises about 5 to about 100, preferably about 10 to about 80, and more preferably about 15 to about 60 ethylene oxide repeating units.

Amounts of the associative vinyl monomer may range from about 0.5 to about 15%, preferably from about 1 to about 10%, and more preferably from about 2 to about 8% by weight of the total copolymer.

Monomer E

One or more cross linking monomers E may optionally be present in the copolymer for purposes of introducing branching and controlling molecular weight. These monomers will be polyunsaturated. Illustrative but not limiting examples are divinyl benzene, divinyl naphthalene, trivinyl benzene, triallyl pentaerythritol, diallyl pentaerythritol, diallyl sucrose, octaallyl sucrose, trimethylol propane diallyl ether, 1,6-hexanediol di(meth)acrylate, tetramethylene tri(meth)acrylate, trimethylol propane tri(meth)acrylate, polyethoxylated glycol di(meth)acrylate, alkylene bisacrylamides, bisphenol A polyethyoxylated dimethacrylate, trimethylol propane polyethoxylated trimethacrylate and similar materials. Preferred for the present invention is bisphenol A polyethoxylated glycol diacrylate, trimethylol propane triacrylate and diallyl pentaerythritol.

Amounts of the cross linking monomer may range from 0 to about 5%, preferably from about 0.05 to about 3%, more preferably from about 1 to about 2%, optimally from about 0.2 to about 1% by weight of the total copolymer.

Adjunct Monomers

Optionally, the copolymer may include a polyacid vinyl monomer. These may be di-, tri- or higher acid functionalized ethylenically unsaturated monomer units. Normally the acid group will be a dicarboxylic acid or salt thereof. Illustrative acids are maleic, fumaric, itaconic and citraconic acids and salts thereof as well as combinations of these. Most preferred is maleic acid which can be generated from using maleic anhydride as starting material and which is hydrolyzed to the diacid in the emulsion polymerization.

When present, the polyacid vinyl monomer may range from about 0.1 to about 10%, usefully from about 0.3 to about 5%, preferably from about 0.4 to 0.6%, by weight based on total copolymer.

Formulations with Rheology Modifiers

Rheology modifying copolymers of this invention can be used in a broad range of industrial and consumer products. These may be found in industries such as adhesives, lubricants (machine and motor vehicle), oil drilling fluids, pharmaceuticals, paints, inks and personal care formulations. Most advantageously, the copolymers are suitable for personal care compositions such as body wash, shampoos, creams and lotions, hair colorants, toothpastes, lipsticks and other colour cosmetics.

Common to many of the personal care compositions besides the rheological modifier is one or more surfactants. The surfactants may be anionic, nonionic, cationic, zwitterionic and amphoteric and mixtures thereof. Amounts of the surfactants may range from 0.1 to 30%, and preferably 5 to 20% by weight of the compositions.

Preferred nonionic surfactants are those with a $C_{10}$-$C_{20}$ fatty alcohol or acid hydrophobe condensed with from 2 to 100 moles of ethylene oxide or propylene oxide per mole of hydrophobe; $C_2$-$C_{10}$ alkyl phenols condensed with from 2 to 20 moles of alkylene oxide; mono- and di-fatty acid esters of ethylene glycol; fatty acid monoglyceride; sorbitan, mono- and di-$C_8$-$C_{20}$ fatty acids; and polyoxyethylene sorbitan as well as combinationsn thereof. Alkyl polyglycosides and saccharide fatty amides (e.g. methyl gluconamides) and trialkylamine oxides are also suitable nonionic surfactants.

Preferred anionic surfactants include soap ($C_8$-$C_{22}$ fatty acid salts); alkyl ether sulfates and sulfonates, alkyl sulfates and sulfonates, alkylbenzene sulfonates, alkyl and dialkyl sulfosuccinates, acyl isethionates, alkyl ether phosphates, sarcosinates, acyl lactylates, sulfoacetates and combinations thereof. The term "alkyl" or "acyl" encompasses from 7 to 24 carbon atoms. Normally the aforementioned anionic surfactants are salts featuring sodium, potassium or ammonium counterions.

Useful amphoteric surfactants include ccoamidopropyl betaine, $C_{12}C_{20}$ trialkyl betaines, sodium lauroamphoacetate, and sodium laurodiamphoacetate. Cationic surfactants are represented by $C_8$-$C_{22}$ alkyl trimethylammonium salts such as cetyltrimethylammonium chloride.

Formulation compositions containing the copolymers of this invention may also include a carrier. Amounts of the carrier may range from 1 to 95%, preferably from 50 to 90%, optimally from 65 to 85% by eight of the composition. Among the useful carriers are water, esters, hydrocarbons, fatty acids, fatty alcohols, thickeners and combinations thereof. The carrier may be aqueous, ahydrous or an emulsion. Preferably the compositions are aqueous, especially water and oil emulsions of the W/O or O/W or triplex W/O/W variety.

All documents referred to herein, including all patents, patent applications, and printed publications, are hereby incorporated by reference in their entirety in this disclosure.

The term "comprising" is meant not to be limiting to any subsequently stated elements but rather to encompass non-specified elements of major or minor functional importance. In other words the listed steps, elements or options need not be exhaustive. Whenever the words "including" or "having" are used, these terms are meant to be equivalent to "comprising" as defined above.

Except in the operating and comparative examples, or where otherwise explicitly indicated, all numbers in this description indicating amounts of material ought to be understood as modified by the word "about".

It should be noted that in specifying any range of concentration or amount, any particular upper concentration can be associated with any particular lower concentration or amount.

Example 1

Typical Catalytic Chain Transfer Polymerization

Azo-isobutyronitrile (0.70 g) (AIBN) was dissolved in 2-ethylhexyl methacrylate (150 mL) and butanone (150 mL) in a 2-arm round bottomed flask fitted with a condenser. The solution was sparged with nitrogen for 45 minutes before addition of Cobaloxime Boron Fluoride (COBF) (10.3 mg). The solution was sparged with nitrogen for a further 5 minutes and the reaction mixture heated to 75° C. for 24 hours. Samples were taken periodically for conversion and molecular weight analysis using $^1$H NMR analysis. The resulting macromonomers were purified by removal of solvent and excess monomer in vacuo Butanone (150 mL) was added to the viscous oil and removed again in vacuo. This cycle was repeated three times to reduce residual monomer content.

Associative Monomer Synthesis

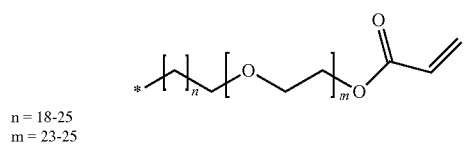

n = 18-25
m = 23-25

Brij® 35 (75 g) was dissolved in 400 ml anhydrous dichloromethane under a nitrogen atmosphere and cooled in an ice bath to 5° C. Triethylamine (10.45 g) was added via syringe. Acryloyl chloride was dispersed in 20 ml anhydrous dichloromethane and added dropwise over a 30 minute period. After complete addition the solution was allowed to warm to room temperature and the reaction stirred over night. The solution was filtered to remove precipitate and washed twice with saturated sodium hydrogen carbonate solution (2×200 ml) and once with saturated brine (200 ml). The product was dried with anhydrous sodium sulphate, filtered and further dried in vacuo.

Typical HASE Polymer Synthesis

A round bottom flask was charged with ethyl acrylate (25.8 g), methacrylic acid (17.6 g), Brij® 35 surfmer (4.28 g), trimethylolpropane triacrylate (0.14 g) and 30% sodium dodecyl sulfonate (SDS) solution (1.57 g). The mixture was sealed and purged with nitrogen for 30 minutes before adding deoxygenated water (12.2 g) and stirring into a pre-emulsion. A multineck round bottom flask was fitted with a nitrogen sparge and overhead stirrer. Deoxygenated water (85.5 g) and 30% SDS solution (0.48 g) were added, stirred at 250 rpm and heated to 85° C. Ammonium persulfate (0.034 g) in water (1 ml) was added via syringe. The pre-emulsion was fed into the surfactant solution via peristaltic pump over 60 minutes. After complete addition the temperature was increased to 95° C. and ammonium persulfate (0.015 g) in water (1 ml) was added and the reaction stirred for a further 90 minutes.

Example 2

A series of copolymers were prepared using the typical HASE polymer synthesis outlined at the end of the preceding Example. Table I details a series of polymers using different macromonomers and varying other components. The Table lists the actives in grams based on 100 grams of emulsion for the HASE synthesis. Not listed is water (which ranges from 77 to 68%) and the active SDS emulsifier and ammonium persulfate.

Preparation of Formulations

Sodium Lauryl Ether Sulfate (160.71 g) was dissolved in water (1106.25 g) aided by mixing with an overhead stirrer. To the solution was added the copolymer solution (60 ml), Kathon CG/ICP II (1.5 ml) and finally Tegobetaine® CK KB 5 (125.00 g). The solution was split into 145 ml aliquots from which base formulations I, II, III and IV were made up as follows:

Formulation I (pH 5.9, 0.68% NaCl): An overhead stirrer was used to mix an aliquot (145 g) of the base solution. The pH was adjusted to pH 5.90 using sodium hydroxide (0.1 M). Sodium chloride (1.125 g) was slowly added and topped with further water (3.875 g).

Formulation II (pH 5.9, 1.58% NaCl): An overhead stirrer was used to mix an aliquot (145 g) of the base solution. The pH was adjusted to pH 6.75 using sodium hydroxide (0.1 M). Sodium chloride (2.25 g) was slowly added and topped with further water (2.75 g).

Formulation III (pH 6.75, 0.68% NaCl): An overhead stirrer was used to mix an aliquot (145 g) of the base solution. The pH was adjusted to pH 6.75 using sodium hydroxide (0.1 M). Sodium chloride (1.125 g) was slowly added and topped with further water (3.875 g).

Formulation IV (pH 6.75, 1.58% NaCl): An overhead stirrer was used to stir an aliquot (145 g) of the base solution. The pH was adjusted to pH 6.75 using sodium hydroxide (0.1 M). Sodium chloride (2.25 g) was slowly added and topped with further water (2.75 g).

Clarity Measurements

Clarity was measured using a SpectraMax Microplate Spectrophotometer for UV/VIS absorbance measurements at 420 nm. Nunc Nuclon D microtitre plates with well capacity of 200 microliters were used for the measurements. Each well was loaded with 150 microliters of sample and four wells were used for each sample with an average value being taken.

The value for demineralized water was then deducted from the sample value and the following clarity ranges were applied:
Clear (transparent) is defined as 0 to 0.2 absorbance.
Haze (translucency) is defined as 0.21 to 0.9 absorbance.
Opaque is defined as at least 0.91 absorbance.

Viscosity Measurements

An Anton Paar ASC32 Rheometer was used to measure viscosity.

Viscosity and clarity performance results of the copolymer Samples in surfactant formulations I, II, III and IV are presented in the lower half of Table I. Viscosities reported in Table I are as Pa·s and at 23° C. with shear rate of 0.1 s$^{-1}$.

TABLE I

| Component | A | B | C | D |
|---|---|---|---|---|
| Ethyl Acrylate | 23.65 | 23.65 | 23.65 | 23.65 |
| Methacrylic Acid | 14.62 | 14.62 | 14.62 | 14.62 |
| Brij ® Surfmer | 1.23 | — | — | — |
| Trimethylolpropane triacrylate | 0.203 | 0.203 | 0.203 | 0.203 |
| PBMA 700[1] | — | — | 2.45 | — |
| PEHMA 1500[2] | — | — | — | — |
| PMMA 1400[3] | — | — | — | 2.45 |
| PMMA 1650[4] | — | — | — | — |
| PBMA 370[5] | — | 2.45 | — | — |
| PEHMA 1000[6] | 1.23 | — | — | — |
| PLMA[7] | — | — | — | — |
| PMMA 600[8] | — | — | — | — |
| PLMA 1000[9] | — | — | — | — |
| Viscosity (Pa·s) at pH 5.9 and NaCl (%) | | | | |
| 0.68% | 11.4 (c) | 6.11 (o) | 14.2 (c) | 3.53 (o) |
| 1.58% | 37.1 (c) | 24.34 (o) | 38.5 (o) | 14.9 (o) |
| Viscosity (Pa·s) at pH 6.75 and NaCl (%) | | | | |
| 0.68% | 14.2 (c) | 12.96 (h) | 13.1 (c) | 5.18 (c) |
| 1.58% | 66 (c) | 47.07 (h) | 33.2 (c) | 17.1 (c) |

| Component | E | F | G | H |
|---|---|---|---|---|
| Ethyl Acrylate | 24.34 | 22.81 | 22.81 | 22.81 |
| Methacrylic Acid | 15.04 | 14.10 | 14.10 | 14.10 |
| Brij ® Surfmer | — | 2.45 | 2.45 | 2.45 |
| Trimethylolpropane triacrylate | 0.203 | 0.203 | 0.203 | 0.203 |
| PBMA 700[1] | — | 1.23 | — | — |
| PEHMA 1500[2] | — | — | — | 1.23 |
| PMMA 1400[3] | — | — | — | — |
| PMMA 1650[4] | — | — | 1.23 | — |
| PBMA 370[5] | — | — | — | — |
| PEHMA 1000[6] | — | — | — | — |
| PLMA[7] | — | — | — | — |
| PMMA 600[8] | 1.23 | — | — | — |
| PLMA 1000[9] | — | — | — | — |
| Viscosity (Pa·s) at pH 5.9 and NaCl (%) | | | | |
| 0.68% | 4.81 (h) | 15.8 (c) | 3.95 (h) | 21.04 (c) |
| 1.58% | 24.73 (o) | 40.8 (h) | 36.59 (h) | 91.54 (c) |
| Viscosity (Pa·s) at pH 6.75 and NaCl (%) | | | | |
| 0.68% | 9.66 (c) | 24.2 (c) | 0.145 (c) | 22.72 (c) |
| 1.58% | 29.98 (c) | 127 (c) | 59.29 (h) | 176 (c) |

TABLE I-continued

| Component | I | J | K | L |
|---|---|---|---|---|
| Ethyl Acrylate | 22.81 | 23.81 | 24.34 | 24.34 |
| Methacrylic Acid | 14.1 | 14.1 | 15.04 | 15.04 |
| Brij ® Surfmer | 2.45 | 2.45 | — | — |
| Trimethylolpropane triacrylate | 0.203 | 0.203 | 0.203 | 0.203 |
| PBMA 700[1] | — | 1.23 | — | — |
| PEHMA 1500[2] | — | — | — | — |
| PMMA 1400[3] | — | — | 1.23 | — |
| PMMA 1650[4] | — | — | — | — |
| PBMA 370[5] | — | — | — | 1.23 |
| PEHMA 1000[6] | — | — | — | — |
| PLMA[7] | 1.23 | — | — | — |
| PMMA 600[8] | — | — | — | — |
| PLMA 1000[9] | — | — | — | — |
| Viscosity (Pa·s) at pH 5.9 and NaCl (%) | | | | |
| 0.68% | 14.7 (c) | 31 (h) | 19.43 (o) | 1.04 (o) |
| 1.58% | 43.9 (h) | 69.2 (h) | 45.74 (o) | 4.43 (o) |
| Viscosity (Pa·s) at pH 6.75 and NaCl (%) | | | | |
| 0.68% | 18.3 (c) | 17.7 (c) | 10.88 (c) | 7.46 (c) |
| 1.58% | 49 (c) | 52.4 (c) | 27.23 (c) | 23.78 (c) |

| Component | M | N | O | P | Q |
|---|---|---|---|---|---|
| Ethyl Acrylate | 24.34 | 23.65 | 23.65 | 22.81 | 23.80 |
| Methacrylic Acid | 15.04 | 14.01 | 14.62 | 14.10 | 13.1 |
| Brij ® Surfmer | — | 1.23 | 1.23 | 2.45 | 3.69 |
| Trimethylolpropane triacrylate | 0.203 | 0.203 | 0.203 | 0.203 | 0.203 |
| PBMA 700[1] | — | — | — | — | — |
| PEHMA 1500[2] | — | — | 1.23 | — | — |
| PMMA 1400[3] | — | — | — | 1.23 | — |
| PMMA 1650[4] | — | — | — | — | — |
| PBMA 370[5] | — | — | — | — | — |
| PEHMA 1000[6] | 1.23 | — | — | — | — |
| PLMA[7] | — | 1.23 | — | — | — |
| PMMA 600[8] | — | — | — | — | — |
| PLMA 1000[9] | — | — | — | — | — |
| Viscosity (Pa·s) at pH 5.9 and NaCl (%) | | | | | |
| 0.68% | 1.35 (o) | 23.3 (c) | 12.8 (c) | 25.5 (h) | 25.7 (h) |
| 1.58% | 8.08 (o) | 57.8 (c) | 51.5 (c) | 92.6 (h) | 53.8 (c) |
| Viscosity (Pa·s) at pH 6.75 and NaCl (%) | | | | | |
| 0.68% | 5.03 (c) | 18.8 (c) | 6.70 (c) | 32.1 (c) | 10.0 (o) |
| 1.58% | 28.9 (h) | 43.5 (c) | 113 (c) | 84.4 (c) | 31.5 (h) |

[1]Polybutyl methacrylate of 700 mw
[2]Polyethylhexylmethacrylate 1500 mw
[3]Polymethylmethacrylate 1400 mw
[4]Polymethylmethacrylate 650 mw
[5]Polybutylmethacrylate 430 mw
[6]Polyethylhexylmethacrylate 1000 mw
[7]Polylaurylmethacrylate
[8]Polymethylmethacrylate 600 mw
[9]Polylaurylmethacrylate 1000 mw
(c) Clear formulation
(h) Hazy formulation
(o) Opaque formulation Copolymers of the present invention are identified as Samples A, F, G, H, I, J, N, O and P. These copolymers are all characterized by having a viscosity of at least 35 Pa·s in strongly salified (1.58% sodium chloride) aqueous systems both at pH 5.9 and 6.75. For purposes of adequate thickening, the range of viscosity in the 1.58% salified aqueous systems at pH 5.9 and 6.75 should range from 35 to 250, preferably from 45 to 130 Pa·s. In Samples B, C, D, E, K, L, M and Q, the copolymers do not contain Brij® Surfiner. These have at least one viscosity below 35 Pa·s at either pH 5.9 or pH 6.75 or both under 1.58% salt water systems.

A further important property of copolymers under the invention is good clarity. The copolymers at pH 5.9 and 6.75, and at 0.68% and 1.58% salt levels, must provide at least translucent (not opaque) formulations. Samples A, F, G, H, I, J, N, O and P meet the translucency requirement. By contrast, Samples B, D, E, K, L, M and Q have at least one opaque formulation.

In summary, the present invention is described above in terms of a preferred and other embodiments. The invention is not limited, however, to the described and depicted embodiments. Rather, the invention is only limited by the claims appended hereto.

The invention claimed is:

1. A rheology modifier a copolymer of formula (I)

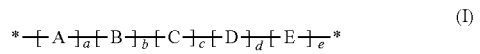

(I)

wherein a, b, c, d and e represent the percentage by weight that each repeating unit monomer is contained within the copolymer, and being:
  a ranges from about 0.5 to about 25% by weight of the copolymer;
  b ranges from about 10 to about 80% by weight of the copolymer;
  c ranges from about 30 to about 85% by weight of the copolymer;
  d ranges from about 0.5 to about 15% by weight of the copolymer; and
  e ranges from 0 to about 5% by weight of the copolymer;
A is a macromonomer pre-formed by catalytic chain transfer comprising at one end a polymerizable group reactive during polymerization with at least one of B, C, D and E monomers, the reactive group at the one end of the macromonomer being attached to a chain formed of a homo- or co-polymer of $C_1$-$C_{22}$ alkyl acrylates, $C_1$-$C_{22}$ alkyl methacrylates, methacrylic acid, acrylic acid and combinations thereof, the macromonomer having a number average molecular weight ranging from about 200 to about 50,000; and
B is acrylic or methacrylic acid or a salt thereof;
C is a $C_1$-$C_8$ ester of acrylic acid or methacrylic acid;
D is an associative monomer of formula (II)

(II)

wherein each $R_2$ is independently H, methyl, —C(=O)OH, or —C(=O)$OR_3$;
$R_3$ is a $C_1$-$C_{30}$ alkyl;
T is —$CH_2$C(=O)O—, —C(=O)O—, —O—, —$CH_2$O—, —NHC(=O)NH—, —C(=O)NH—, Ar—$(CE_2)_z$-NHC(=O)O—, —Ar—$(CE_2)_z$-NHC(=O)NH—, or —$CH_2CH_2$NHC(=O)—;
Ar is divalent aryl;
E is H or methyl;
z is 0 or 1;
k is an integer in the range of 0 to 30; and m is 0 or 1;
with the proviso that when k is 0, m is 0, and when k is in the range of 1 to 30; m is 1;
$(R_4O)_n$ is polyoxyalkylene, which is a homopolymer, a random copolymer, or a block copolymer of $C_2$-$C_4$-oxyalkylene units, wherein $R_4$ is $C_2H_4$, $C_3H_6$, $C_4H_8$, or a mixture thereof, and n is an integer in the range of 5 to 250;
Y is —$R_4$O—, —$R_4$H—, —C(=O)—, —C(=O)NH—, =$R_4$NHC(=O)NH—, or —C(=O)NHC(=O)—; and
$R_5$ is substituted or unsubstituted alkyl selected from the group consisting of $C_8$-$C_{40}$ linear alkyl, $C_8$-$C_{40}$ branched alkyl, $C_8$-$C_{40}$ carbocyclic alkyl, $C_2$-$C_{40}$ alkyl-substituted, phenyl, aryl-substituted $C_2$-$C_{40}$ alkyl, and $C_8$-$C_{80}$ complex ester; wherein the $R_5$ alkyl group optionally comprises one or more substituents selected from the group consisting of hydroxy, alkoxy, and halogen; and
E is optionally present representing a cross linking monomer for introducing branching and controlling molecular weight, the cross linking monomer comprising polyfunctional units carrying multiple reactive functionalization groups selected from the group consisting of vinyl, allylic and functional mixtures thereof, the groups A, B, C, D and E being covalently bonded one to another in a random, a block or a cross-linked copolymer format.

2. The copolymer according to claim 1 wherein the macromonomer A has a number average molecular weight ranging from about 400 to about 10,000.

3. The copolymer according to claim 1 wherein the macromonomer A is selected from the group consisting of polymethylmethylacrylate/polymethacrylic acid, polymethylmethacrylate, polymethacrylic acid, polybutylmethacrylate, polyethylhexylmethacrylate and combinations thereof.

4. The copolymer according to claim 1 wherein the macromonomer A is pre-formed by polymerization through incorporation of a catalytic chain transfer agent which is a cobalt catalyst.

5. The copolymer of claim 1 further comprising a polyacid vinyl monomer which is selected from the group consisting of maleic anhydride, acid and salts thereof; fumaric acid and salts thereof; itaconic acid and salts thereof; citraconic acid and salts thereof; and mixtures.

6. The copolymer according to claim 1 wherein monomer C is selected from the group consisting of ethylacrylate, methylacrylate, ethylmethacrylate, methylmethacrylate, butylacrylate, butylmethacrylate and mixtures thereof.

7. The copolymer of claim 1 wherein the associative monomer D is selected from the group consisting of cetyl polyethoxylated methacrylate, cetearyl polyethoxylated methacrylate, stearyl polyethoxylated (meth)acrylate, arachidyl polyethoxylated (meth)acrylate, behenyl polyethoxylated methacrylate, lauryl polyethoxylated methacrylate, hydrogenated castor oil polyethoxylated methacrylate, and canola polyethoxylated (meth)acrylate.

8. The copolymer according to claim 1 wherein all acid units are in salt form.

9. The copolymer of claim 1 wherein
  a ranges from about 0.5 to about 15% by weight of the copolymer;
  b ranges from about 25 to about 70% by weight of the copolymer;
  c ranges from about 45 to about 75% by weight of the copolymer;

d ranges from about 1 to about 10% by weight of the copolymer; and e ranges from about 0.05 to about 3% by weight of the copolymer.

10. The copolymer according to claim 1 comprising cobalt in an amount from about 1 to about 100 ppm by weight of the copolymer.

11. The copolymer according to claim 1 having a viscosity at pH 5.9 and 6.75 in a 1.58% sodium chloride aqueous solution at a level ranging from 35 to 250 Pa·s.

* * * * *